May 8, 1956 E. H. GRANBERRY ET AL 2,744,801
SLASHER CREEL BEAM BEARING
Filed Jan. 11, 1955 3 Sheets-Sheet 1

INVENTORS
EDGAR H. GRANBERRY
JOHN M. WALL
BY Cushman, Darby & Cushman
ATTORNEYS

May 8, 1956  E. H. GRANBERRY ET AL  2,744,801
SLASHER CREEL BEAM BEARING

Filed Jan. 11, 1955  3 Sheets-Sheet 2

INVENTORS
EDGAR H. GRANBERRY
JOHN M. WALL

BY Cushman, Darby & Cushman
ATTORNEYS

May 8, 1956 — E. H. GRANBERRY ET AL — 2,744,801
SLASHER CREEL BEAM BEARING
Filed Jan. 11, 1955 — 3 Sheets-Sheet 3
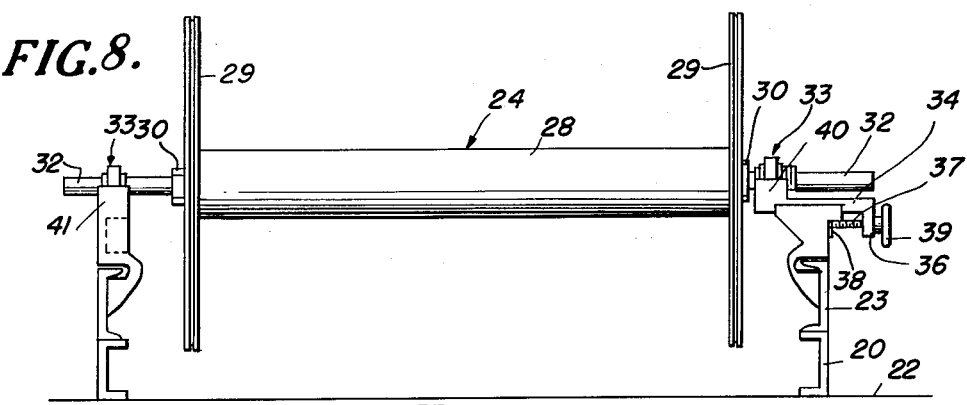
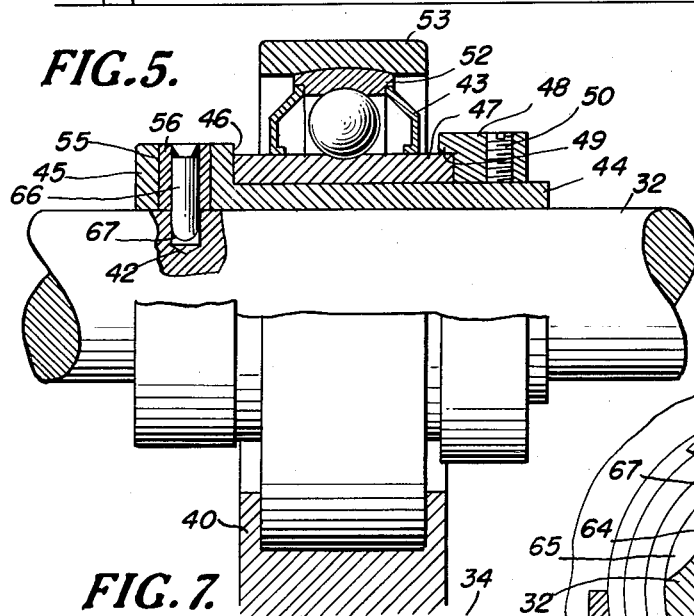
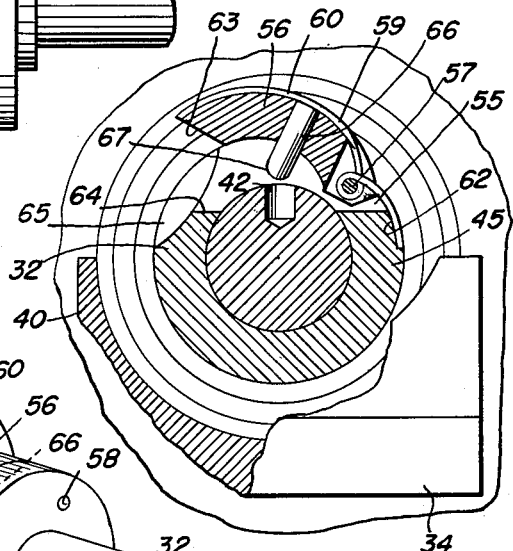
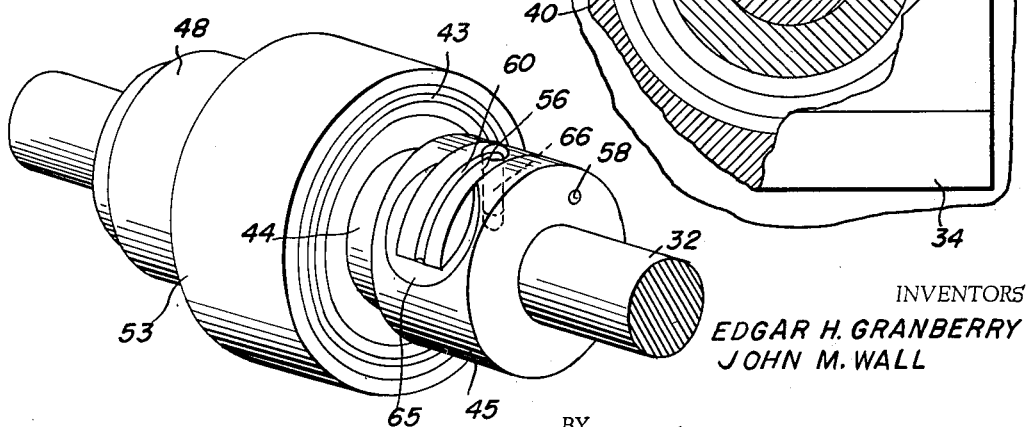
INVENTORS
EDGAR H. GRANBERRY
JOHN M. WALL
BY Cushman, Darby & Cushman
ATTORNEYS

United States Patent Office

2,744,801
Patented May 8, 1956

2,744,801

SLASHER CREEL BEAM BEARING

Edgar H. Granberry, Shawmut, Ala., and John M. Wall, Columbus, Ga., assignors to West Point Manufacturing Company, Shawmut, Ala., a corporation of Alabama Application January 11, 1955, Serial No. 481,115

8 Claims. (Cl. 308—236)

This invention relates to bearings, and in particular to bearing units readily engageable to and removable from associated journals. The invention relates also to beams used in the textile industry, and to creel structure adapted to mount such beams.

In conventional textile practice a creel, for example a slasher creel, may mount from 6 to 20 individual section beams. The heads of the several beams must be precisely aligned, to prevent yarn from rubbing or chafing the heads of succeeding beams. Customarily, each beam journal is provided with an antifriction bearing slidably mounted thereon and these bearings are positioned, on the creel, in retaining cups supported on the creel pedestals. The bearing retaining cups are usually mounted in or on axially movable slides, and means are provided, usually thread means, to axially adjust the support slides on both sides of the creel.

To align each beam, according to prior practice an operator must first adjust the support slide at one end thereof, moving the slide and the bearing resting therein against the adjacent beam nut, and then by force exerted against the beam nut displacing the beam toward the opposite side of the creel. Having in this manner adjusted the beam to approximate alignment, the operator must then move to the other side of the creel and adjust the opposite support slide until the bearing resting thereon firmly engages the beam nut on that side. The beam is thereby firmly fixed in axial disposition, but if the alignment so established is not precisely correct, the operator must move from end to end of the beam alternately adjusting the support slides until proper and firm alignment is attained.

The aligning procedure is troublesome and time consuming, requiring an operator to walk repeatedly back and forth around the creel, or the services of two operators working together. Since each beam, when aligned, is necessarily maintained in alignment by lateral pressure of its bearings against the beam nuts, an undesirable thrust load is imposed on the bearings. As the bearing inner races are free on the journals, there is frequently relative rotational movement therebetween with resultant wear on the beam nuts and journals. Often, considerable friction resistance to beam rotation results, imposing a drag force which may vary greatly from beam to beam. A resultant common problem in slashing is difference in stretch as between warp ends from different beams, all yarn lengths remaining when the first set of ends runs out being waste.

It is a principal object of the present invention to provide a novel and improved anti-friction bearing unit readily engageable to and detachable from a journal. Another object of the invention is to provide novel journal and bearing structure, providing for precise positioning and retention of the bearing on the journal, and also for ready disengagement and removal of the bearing from the journal when such is desired.

A further object of the invention is to provide a novel textile beam provided with a slidable bearing on one end and a detachably engageable bearing unit on the other end thereof.

Still another object is the provision of an improved and simplified textile creel, with which all beam aligning adjustments may be quickly and readily made from one side thereof by a single operator. An allied object is the provision of creel structure in which the beam bearings are subjected to no thrust load, and wear on the bearings, beam nuts and beam journals is practically eliminated.

Yet another object of the invention is to provide a textile creel exhibiting improved and particularly more uniform beam operation, whereby yarn from various beams may be subjected to identical stretch, and yarn waste thereby eliminated. Further objects of the invention will be in part evident, and in part pointed out hereinafter.

The invention and the novel features thereof may best be made clear from the following description, and the accompanying drawings in which:

Figure 5 is a sectional view taken on the line 5—5 of Figure 4;

Figure 6 is a sectional view taken on the line 6—6 of Figure 4, but showing the trigger and pin of the device disengaged from the associated journal;

Figure 7 is a perspective view of the bearing unit of Figures 3 and 4, and

Figure 8 is a somewhat diagrammatic end elevational view of a creel constructed according to the present invention.

Figure 1:
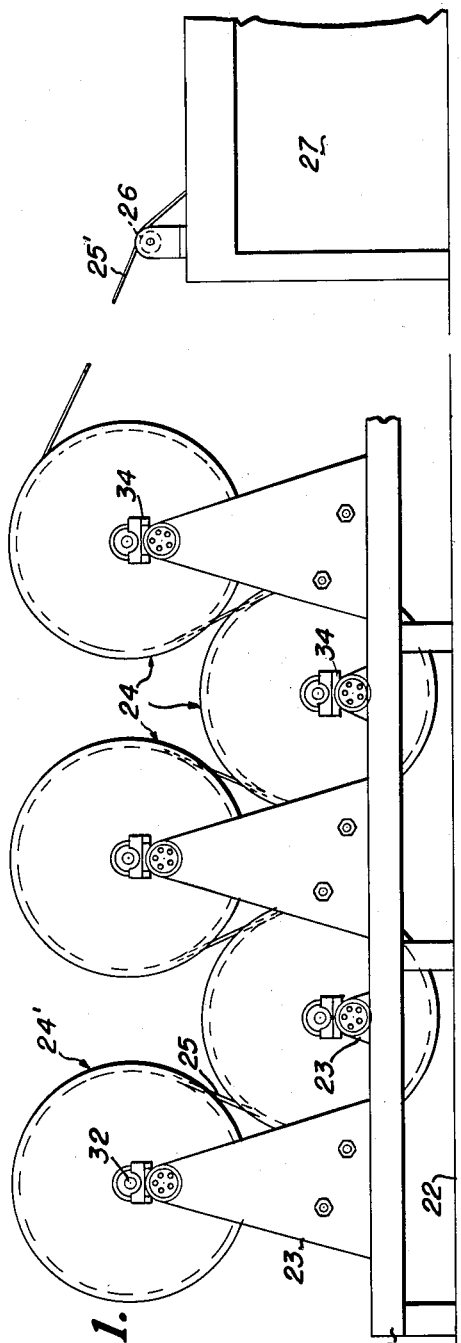
Figure 1 is a side elevational view of a slasher creel embodying the present invention.
Figure 2:
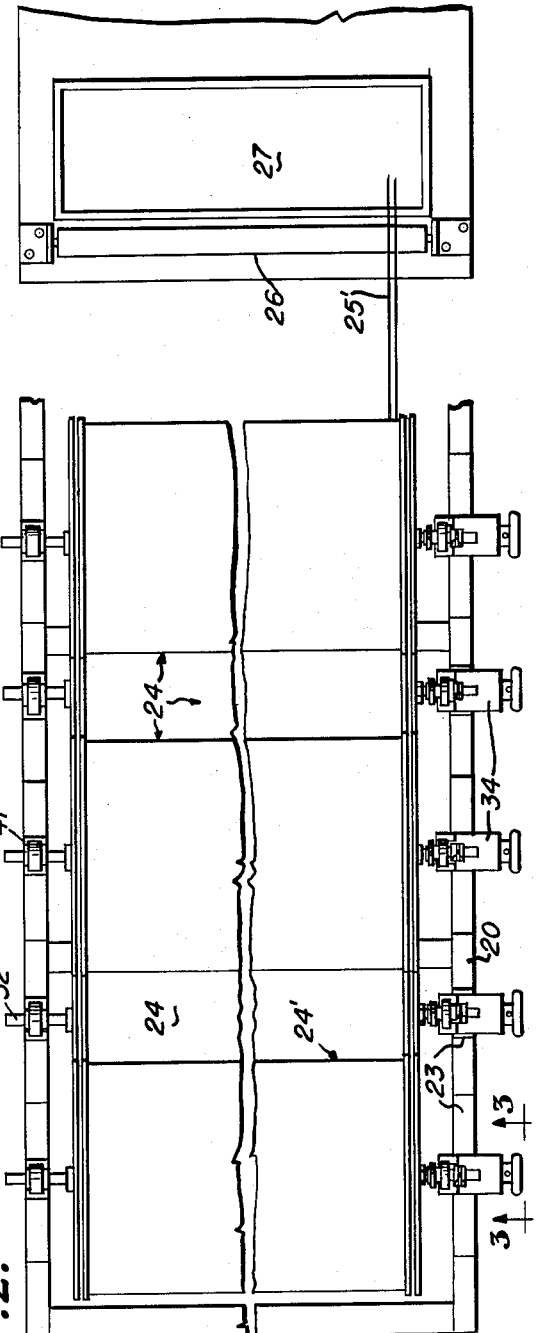
Figure 2 is a top plan view of the creel of Figure 1.

Referring to the drawings in detail, Figures 1, 2 and 8 illustrate a slasher creel constructed in accordance with the present invention, including a frame 20 resting on the floor 22, the frame mounting a plurality of transversely aligned pairs of pedestals 23. Alternate pedestal pairs may be high and low in conventional manner, whereby successive beams supported thereon may be staggered in space saving relationship, as shown. Each pedestal pair normally supports a beam indicated generally as 24. In the case of a slasher creel, warp ends 25 are drawn from the most remote beam 24', and passed about the next beam in succession from which additional ends are added to the yarn layer. Finally, the complete yarn layer 25' may be passed over a guide roller 26 into a size tank 27.

An exemplary beam according to the present invention is illustrated in Figure 8, and includes a barrel 28 provided with a head 29 at each end thereof. A nut 30 maintains each head in place, and an axial journal 32 extends outwardly from each end of the beam. When positioned in the creel, each journal 32 is provided with an anti-friction bearing 33.

Figures 3, 4:
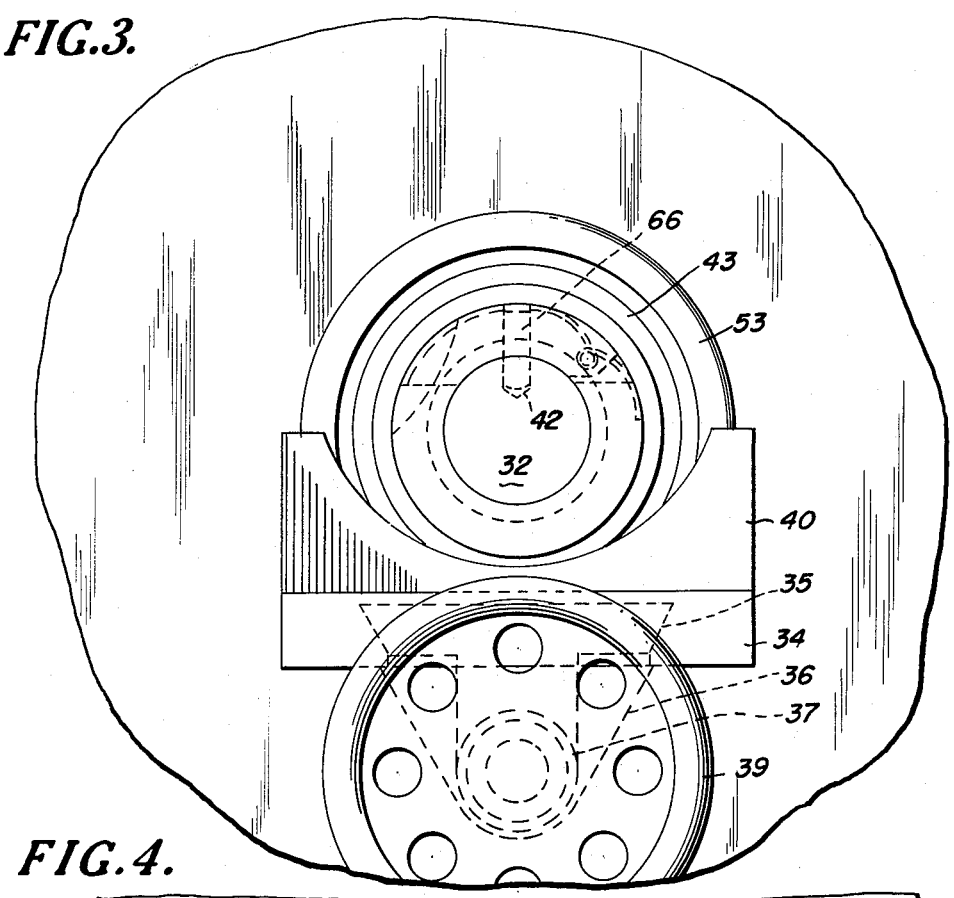
Figure 3 is an end view, on enlarged scale, of the bearing unit of the present invention and its slidable creel support, taken substantially on the line 3—3 of Figure 2.
Figure 4 is a top plan view of the bearing unit of Figure 3, on similarly enlarged scale.

Along one side of the creel each pedestal 23 carries a slide 34 mounted for transverse slidable relative movement thereon, as by means of a dovetail slide joint. For example, the slide may be engaged to and ride on a transversely elongated pedestal guide 35 (Figure 3). As best illustrated in Figure 8, each slide may be provided with a downwardly depending lug 36, apertured and internally threaded to enclose and threadably engage an adjusting screw 37, the inner end of which is rotatably fixed to the pedestal at 38, and the outer end of which bears a hand wheel 39 fixed thereto. As will be understood, the hand wheel 39 and screw 37 may be rotated to effect transverse adjustment of the slide 34 relative to the pedestal. The end of the slide opposite lug 36 is formed into an upstanding retaining cup 40, adapted to partially receive a beam bearing 33 and restrain such bearing from transverse movement relative to the cup.

As indicated previously, in conventional creel construction the opposite pedestal may be similarly provided with a laterally adjustable slide and corresponding associated structure. In the present creel, however, the opposite pedestal may be provided merely with a stationary retaining cup 41, fixedly mounted at the top of the pedestal.

According to the present invention, one beam spindle is adapted for detachable engagement with its associated bearing. For example, one spindle of the beam may be radially bored as at 42, at a point suitably spaced from the adjacent beam nut (see Figures 5 and 6), and the corresponding bearing adapted for detachable engagement with the bore. As illustrated in Figures 3 to 7, a common anti-friction bearing 43 may be employed, mounted on a sleeve 44 fitting closely therewithin. One end of the sleeve 44 is formed into an annular enlargement 45, which presents a shoulder 46 to the inner race 47 of the bearing. To suitably retain the bearing on the sleeve, and firmly against enlargement shoulder 46, a collar 48 may be provided around the opposite end of the sleeve positioned against the opposite end of the inner race 47. This collar is provided, in the illustrative example, with an overhanging lip 49 enclosing the race end and a set screw 50 threaded thereinto, adapted to engage the sleeve and lock the collar thereto. The outer race 52 of the bearing may be enclosed by a cartridge ring 53, adapted to fit closely within the U-shaped seat 54 of the slide retaining cup 40 (see Figure 5).

Referring particularly to Figures 4 to 7, the sleeve enlargement 45 may be tangentially slotted at 55, to accommodate a trigger 56 pivotally mounted on a pin 57, which may be fixed in the bore 58 extending longitudinally through the enlargement. The trigger is urged constantly inwardly by resilient means such as spring 59, wound about the pivot pin 57 and extending into and retained by peripheral grooves 60 and 62, provided respectively in the outer surfaces of the trigger 56 and the sleeve enlargement 45. The outer end of trigger 56 comprises a stop surface 63 (see Figure 6) adapted to meet the bottom surface 64 of the slot 55, and the enlargement 45 may be provided in the vicinity of slot bottom surface 64 with a finger well 65. As will be understood, the spring 59 constantly urges the trigger 56 pivotally inwardly, so that the trigger stop surface 63 will normally engage the slot bottom surface 64, and the outer surface of the trigger is formed to coincide generally, in such case, with the outer surface of the sleeve enlargement 45.

Approximately centrally thereof, the trigger 56 is provided with an inwardly projecting pin 66 or similar element, which is fixedly secured thereto as by welding, the pin being provided with a rounded inner end 67 and adapted to seat and fit closely in the journal bore 42. The sleeve, trigger and pin, then, constitute detent means by which the bearing 43 may be readily engaged to the bore 42 of the beam journal, and as readily disengaged and removed therefrom. Obviously, other suitable and equivalent detachable engagement means may be employed to releasably position the bearing on the journal.

Operation and function of the invention will now be described in detail. In the illustrative case of a slasher creel, each section beam is wound with yarn at the warper, and then ordinarily moved to storage. When the beam is subsequently moved to the slasher creel, an ordinary anti-friction bearing may be positioned on one journal thereof and a bearing unit in accordance with the present invention on the other journal, or in the embodiment illustrated on the journal provided with bore 42. To position the novel bearing unit the trigger 56 must necessarily be pivoted outwardly against the force of spring 59, to a position corresponding substantially to that shown in Figure 6. Outward movement of the trigger may be readily and conveniently effected by inserting a finger into well 65 and exerting finger pressure upwardly against the trigger stop surface 63. The bearing unit sleeve may be loose fitting on the journal, so that the unit may be moved easily thereon, with the inner end 67 of the trigger pin 66 riding the journal surface, until the trigger pin is aligned with the journal bore 42 and snapped into locking engagement therewith by its spring 56.

The cartridge ring 53 of the bearing unit may then be aligned with and lowered into the seat 54 of slide retaining cup 40, and the slidable bearing on the opposite journal moved into alignment with and positioned in the fixed retaining cup 41 on that side of the creel. Since the slidable bearing is freely movable axially of its journal, the beam may be readily positioned in the creel no matter what the initial adjusted position of the slide 34.

To adjust the so-positioned beam transversely, an operator need only rotate the hand wheel 39, to laterally adjust the slide 34. The associated bearing unit, it will be understood, is constrained by cup 40 to move with the slide, and the beam is moved with the bearing unit, by reason of the engagement of its journal to the bearing unit. In such adjustment the opposite beam journal slides freely through its slidable bearing, which is held in place by the stationary retaining cup 41. In this manner complete and precise axial adjustment of the beam may be made from one side of the creel, in minimum time and with little effort.

In finally adjusted position, both the novel bearing unit according to the invention and the opposite slidable bearing remain spaced from the corresponding head nuts of the beam, whereby no thrust load is imposed on the bearings, and the beam is subjected to no frictional drag load thereby. The possibility of undue wear on the bearings, beam nuts and journals is accordingly entirely precluded. After placement and alignment of the beam, its journals may be weighted or chained down in conventional manner to give the beam a predetermined and controlled resistance to rotation, so that the yarn thereon may be uniformly stretched to desired degree. Other section beams may be positioned in the creel and axially aligned in similar manner. When all beams are properly in place, the ends therefrom may be arranged and gathered and led into the size tank, wherein they are sized for weaving on the loom. The beams and bearing units of the present invention may be used with conventional creels having adjustable slides on both sides thereof. In such case, the slides on one side of the creel need never be adjusted, but may be employed as stationary supports.

While the illustrated embodiment of the bearing unit is simple and preferred for many applications, it will be evident that equivalent variations may be employed. The inner race 47 of the bearing and the sleeve 44, for example, may be integral if desired. Similarly, the lock collar 48 may engage the sleeve 44 by screw threads or similar means, instead of by set screw 50. As previously indicated, other detent and detachable engagement means for the bearing unit and journal equivalent to the trigger and pin construction illustrated may be utilized.

When the section beams have been emptied of yarn, each may be readily disengaged and lifted from the creel, and its bearings may be removed for use with other beams. The slidable bearing is merely passed off the end of its journal, and the novel bearing unit is disengaged from its journal by finger pressure against trigger 56, in the manner described, to lift pin 57 out of the journal bore 42, whereupon the bearing unit may freely pass off the end of its journal. The beam construction and the bearing and bearing unit of the present invention are obviously useful in applications other than with slasher creels. They may be employed, for example, in warpers and for numerous other purposes which will be evident to those skilled in the art.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. In combination, a sleeve, a pin pivotally mounted on said sleeve, said pin extending normally inside the inner diameter of said sleeve, an anti-friction bearing mounted on said sleeve, and a locking collar fixed to said sleeve to retain said bearing thereon.

2. In combination, a journal, a sleeve on said journal, a trigger pivotally mounted on said sleeve, a pin extending radially inwardly from said trigger, the inner end of said pin extending normally inside the inner diameter of said sleeve, a radial bore in said journal adapted to be engaged by said pin, an anti-friction bearing mounted on said sleeve, and means adapted to retain said bearing on said sleeve.

3. In combination, a journal, a sleeve on said journal, a trigger pivotally mounted on said sleeve on a longitudinal axis, spring means engaging said trigger and said sleeve to urge said trigger inwardly with respect to said sleeve, a pin extending radially inwardly from said trigger, the inner end of said pin extending normally inside the inner diameter of said sleeve, a radial bore in said journal adapted to be engaged by said pin, an anti-friction bearing mounted on said sleeve, and a locking collar fixed to said sleeve to retain said bearing thereon.

4. In combination, a beam having journals extending from opposite ends thereof, an anti-friction bearing slidably mounted on one of said journals, a sleeve on the other of said journals, a trigger pivotally mounted on said sleeve, a pin extending radially inwardly from said trigger, the inner end of said pin extending normally inwardly inside the inner diameter of said sleeve, a radial bore in said other journal adapted to be engaged by said pin, an anti-friction bearing mounted on said sleeve, and means adapted to retain said bearing on said sleeve.

5. In combination, a creel including aligned beam supports, one of said supports being adjustable relative to the other, a beam having journals extending from opposite ends thereof, an anti-friction bearing slidably mounted on one of said journals, a sleeve on the other of said journals, a trigger pivotally mounted on said sleeve, a pin extending radially inwardly from said trigger, the inner end of said pin extending normally inwardly inside the inner diameter of said sleeve, a radial bore in said other journal adapted to be engaged by said pin, a second anti-friction bearing mounted on said sleeve, and means adapted to retain said second bearing on said sleeve, said second bearing resting on said adjustable support and said slidably mounted bearing resting on said aligned support.

6. In combination, a journal, a sleeve on said journal, a pin pivotally mounted on said sleeve, said pin extending normally inside the inner diameter of said sleeve, a radial bore in said journal adapted to be engaged by said pin, an anti-friction bearing mounted on said sleeve, and means adapted to retain said bearing on said sleeve.

7. In combination, a beam having journals extending from opposite ends thereof, an anti-friction bearing slidably mounted on one of said journals, a sleeve on the other of said journals, a pin pivotally mounted on said sleeve, said pin extending normally inside the inner diameter of said sleeve, a radial bore in said other journal adapted to be engaged by said pin, an anti-friction bearing mounted on said sleeve, and means adapted to retain said bearing on said sleeve.

8. In combination, a creel including alined beam supports, one of said supports being adjustable relative to the other, a beam having journals extending from opposite ends thereof, an anti-friction bearing slidably mounted on one of said journals, a sleeve on the other of said journals, a pin pivotally mounted on said sleeve, said pin extending normally inside the inner diameter of said sleeve, a radial bore in said other journal adapted to be engaged by said pin, a second anti-friction bearing mounted on said sleeve, and means adapted to retain said second bearing on said sleeve, said second bearing resting on said adjustable support and said slidably mounted bearing resting on said aligned support.

References Cited in the file of this patent
UNITED STATES PATENTS

| | | |
|---|---|---|
| 539,260 | Gottschalk et al. | May 14, 1895 |
| 1,094,312 | Delmez | Apr. 21, 1914 |
| 1,264,165 | Eaglesfield | Apr. 30, 1918 |
| 1,406,843 | Gathman | Feb. 14, 1922 |
| 1,836,339 | Ronk | Dec. 15, 1931 |
| 2,301,405 | Holtzmann | Nov. 10, 1942 |